United States Patent [19]

Games et al.

[11] 3,755,628

[45] Aug. 28, 1973

[54] TIME DIVERSITY, MULTI-REDUNDANT DATA SYNCHRONIZED TRANSMISSION SYSTEM

[75] Inventors: John E. Games, Granby; John Saunders, East Hartford; Ivor Hughes, Granby, all of Conn.

[73] Assignee: United Aircraft Corporation, East Hartford, Conn.

[22] Filed: Dec. 4, 1970

[21] Appl. No.: 95,231

[52] U.S. Cl. .......................... 179/15 BS, 179/41 A

[51] Int. Cl. .......................... H04g 7/04, H04m 3/00

[58] Field of Search ........................ 179/15 BS, 41 A

[56] References Cited

UNITED STATES PATENTS

| | | | |
|---|---|---|---|
| 3,467,779 | 9/1969 | Deurdoth | 179/15 BS |
| 3,483,330 | 12/1969 | Inose | 179/15 BS |
| 3,566,267 | 2/1971 | Golding | 179/15 BS |
| 3,410,963 | 11/1968 | Malm | 179/41 A |
| 3,555,424 | 1/1971 | Malm | 179/41 A |
| 3,564,150 | 2/1971 | Muller | 179/41 A |
| 3,571,519 | 3/1971 | Tsimbidis | 179/41 A |

*Primary Examiner*—Harold I. Pitts
*Attorney*—Melvin Pearson Williams

[57] ABSTRACT

Four independent data stations, each having data sources and data responders, transmit data signals from one to another in response to commands, in the nature of polling instructions or addresses, generated by one of the units. Time division multiplexed transmission is over dual lines in the form of bipolar/return-to-zero signals which permit utilizing discrete signals indicative of either data ONEs or ZEROs as a data clock for synchronizing the transmitting, receiving and command stations. Counters indicate completion of transmission of fixed formatted groups of data words, and monostable multivibrator time outs are used to sense times between words, between multiword transmission and reception periods, and between frames of transmission periods. The receiver of each unit recognizes the unit designations of each command, causing that unit to transmit or receive when it is involved, and preventing that unit from recognizing further data signals when it is not involved. Substantially every part of each of the units, including the command section of one of the units, is provided in triple redundancy, there also being provided three independent, bipolar/return-to-zero data channels. One of the data channels is provided with a two word delay at the output of each transmitter and no delay at the input to each receiver; a second data channel is provided with a one word delay at the output of each transmitter and a one word delay at the input to each receiver; and the third data channel is provided with no delay at the output of each transmitter and a two word delay at the input to each receiver; thus the actual transmission is provided with time diversity, whereby noise, such as a flash of lightening might generate, effects only one word out of the three redundant words being transmitted since the other two words are diverse in time from the generated noise. Data, and certain of the functions for controlling the units, are majority-voted so that the data or control indicium is taken to be that for which two out of the three redundant sets indicate likeness.

6 Claims, 18 Drawing Figures

INVENTORS
JOHN E. GAMES
JOHN SAUNDERS
IVOR HUGHES
BY Melvin Pearson Williams
ATTORNEY

FIG. 9 K CH A COMMAND DE-SERIAL & DECODE

TIME DIVERSITY, MULTI-REDUNDANT DATA SYNCHRONIZED TRANSMISSION SYSTEM

BACKGROUND OF THE INVENTION

1. Field of Invention

This invention relates to data transmission, and more particularly to a data transmission achieving extremely high reliability by means of time diversity, multiple redundancy transmission and control and related data synchronization between units.

2. Description of the Prior Art

As an example of an environment to which the present invention relates and for which the present invention provides significant advantage, consider avionic systems such as are found on both military and commercial aircraft. Recent increases in the size of aircraft have resulted in an enormous quantity of electrical cables in order to communicate signals of various sorts between the several parts of the aircraft. This is not only true for weaponry systems of the type found in military aircraft, but is also true of monitoring and control systems of the type found in both military and commercial aircraft. The recent increases in complexity and sophistication of both military and commercial aircraft have further compounded the problem of electric cable weight in the aircraft. As a result, design specifications for some aircraft now provide for time diversity multiplexing of a large number of signals over a relatively small number of electric cables, thereby to reduce the amount of electric cabling and therefore its weight.

A necessary corollary to the reduction of the amount of cabling in a system is an increase in the dependency of that system on the cabling which is used. Thus, if a single set of time division multiplexed cables run fore and aft through an aircraft, communications between all of the stations in the forward end of the craft and all of the stations in the aft end of the craft are dependent upon the same cabling as well as some of the same electronic transmission equipment, rather than having only certain functions depending upon each set of cables or equipment, as would be true in systems of the prior art. Therefore, a data transmission system utilized for time division multiplexing of a large number of units must be extremely reliable.

In an overall data transmission system where high reliability is required, it is not only necessary that the common communication link be highly reliable, but that the means within each individual unit which either energizes or responds to the communication link must be equally reliable. In addition, the dependability of a link from one unit to another unit should not be jeopardized by a failure in a third unit. Therefore, polling sequences are to be avoided if they rely upon response from each unit in turn, in a sequence, to initiate operation of a subsequent unit in the subsequence and if they could become hung-up or inoperable as a result of failure of a polled unit. Similarly, if synchronizing among the units is dependent upon a single unit, not only is the operation of the entire system dependent upon proper operation of the synchronizing unit, but the synchronizing unit must be interconnected with all of the units of the system, making the common communication link between the units that much more complex, which tends to defeat the purpose of a time diversity multiplexed system in the environment described hereinbefore.

SUMMARY OF INVENTION

The object of the present invention is to provide a highly reliable communication system; another object of the present invention is to provide a communication system wherein the common communication link is as simple as possible; a further object of the present invention is to provide a communication system having maximum insensitivity to noise and other undesireable effects.

According to the present invention, a common communication link in a data communicating system is multi-redundant with data transfer on each data communicating bus or channel of a multi-channel system being diverse in time with respect to the other data channels in the system. According further to the present invention, not only is multiple redundancy employed in the common communication link, but also in a substantial portion of the electronic apparatus which transfers data signals to and receives data signals from said common communication link. In still further accord with the present invention, synchronism between the various units of a data communication system is achieved by synchronizing each of the units to the data signals on the common communication link; in accordance with this aspect of the invention in one form, data on the common communication link is sent in the form of bipolar return to zero signals whereby the presence of either a binary one or a binary zero in a digital format will result in a data clock signal in each of the units responsive to the common communications link. In accordance with the invention, both data signals and control signals are majority-voted, thus causing each unit to sense a related signal in response to a majority of the channels of the communication link or control circuits, indicating such a signal at the same time.

In accordance with the invention still further, various of the control functions within each data unit which are provided in multiplicity are majority voted in each of the redundant portions of the system so as to cause said system to operate in a reliable and synchronous fashion even though independent and redundant portions thereof are provided.

The present invention provides a relatively simple overall system wherein data synchronizing of the units is achieved with a high degree of reliability, majority voting of functions, data and clock signals providing operational condition even in the face of a high degree of noise and/or failure. The invention permits utilization of an ultra simple common communication link, with multiplicity of function and other safeguards causing only an increase in the amount of apparatus required in each of the individual units, such apparatus being capable of implementation in monolithic solid state circuits, whereby total overall system cost and weight is reduced to a minimum.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figures 1, 2:
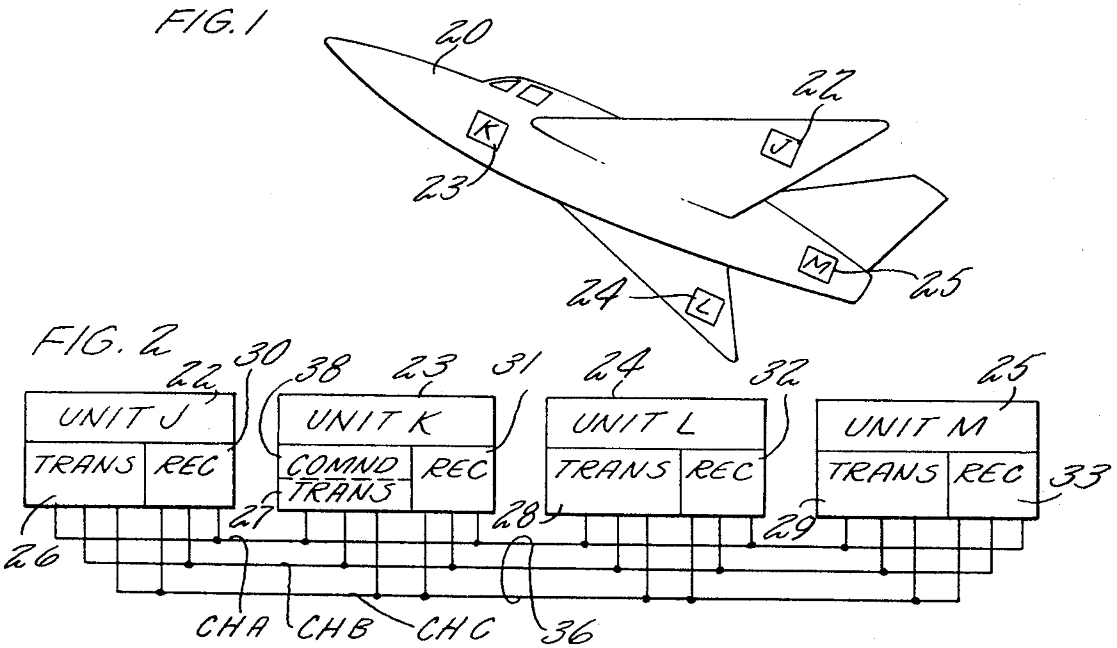
FIG. 1 is a simplified illustration of a four unit system in accordance with the present invention as mounted on an aircraft.
FIG. 2 is a simplified block diagram of an exemplary system in accordance with the present invention.

Referring now to FIG. 1, a typical environment in which the present invention may be practiced may comprise an aircraft 20 within which four communication units 22–25 are designated J, K, L and M, respectively. In the typical environment of FIG. 1, units J and L are mounted in respective wings of the aircraft, unit M is mounted in the tail of the aircraft, and unit K is mounted in the forward or central portion of the aircraft. As illustrated in FIG. 2, each of the units 22–25 includes a respective transmitter 26–29 and a respective receiver 30–33. Each transmitter and each receiver is connected to a triple redundant communication link 36 having three channels designated A, B and C, respectively. Each of the units 22–25 is identical, with the exception of one of them which includes a command generator; in the embodiment herein, unit K, 23, includes a command generator 38; unit K, 23 has all of the functions of the other units 22, 24, 25. The embodiment of FIGS. 1 and 2 is further illustrated in FIG. 3 wherein channels A, B and C (36) are shown running vertically and connected to exemplary ones of the transmitters and receivers of three of the units 22–24.

Figure 3:
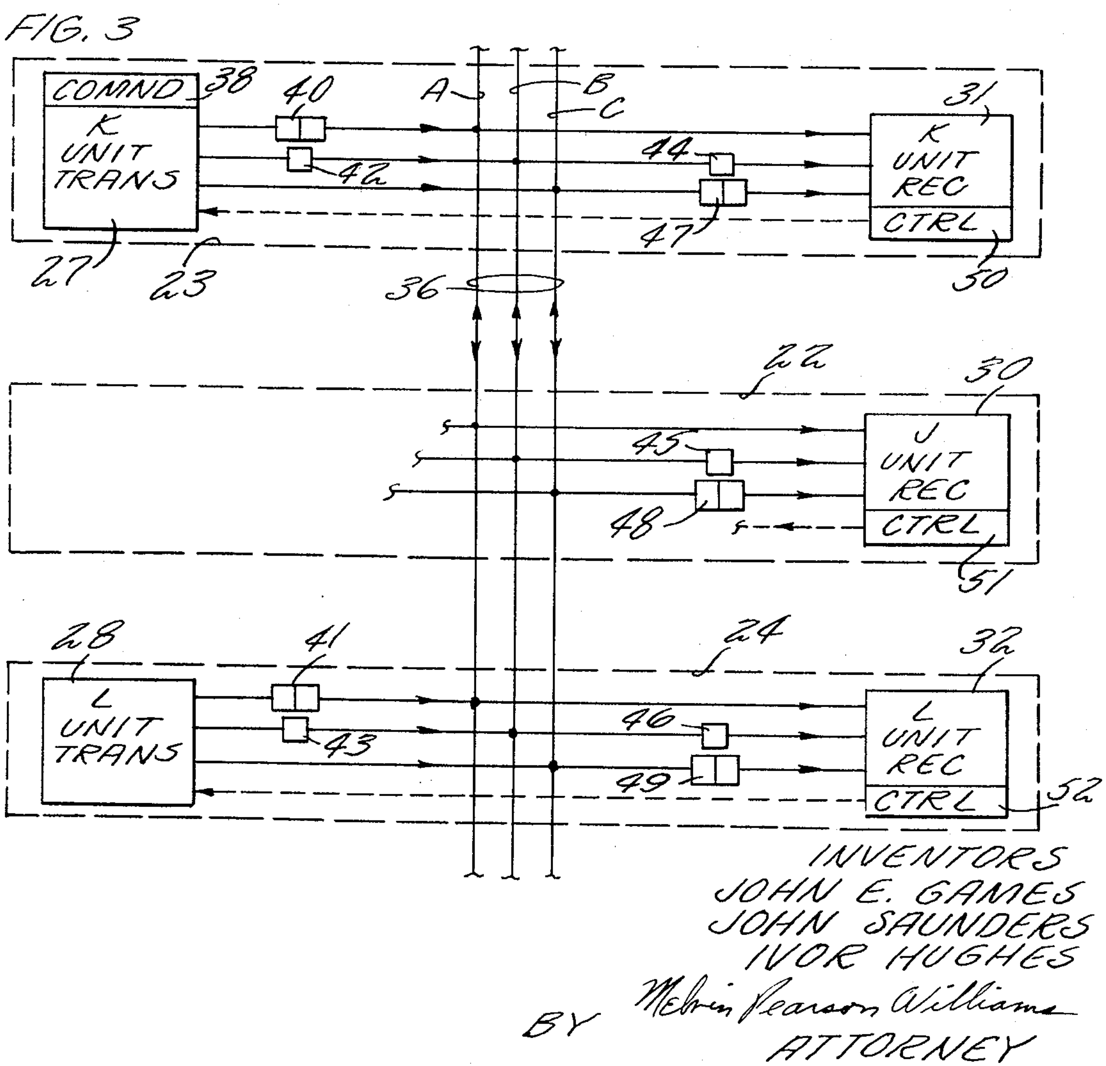
FIG. 3 is a simplified schematic block diagram further illustrating the embodiment of FIG. 2.
Figure 4:
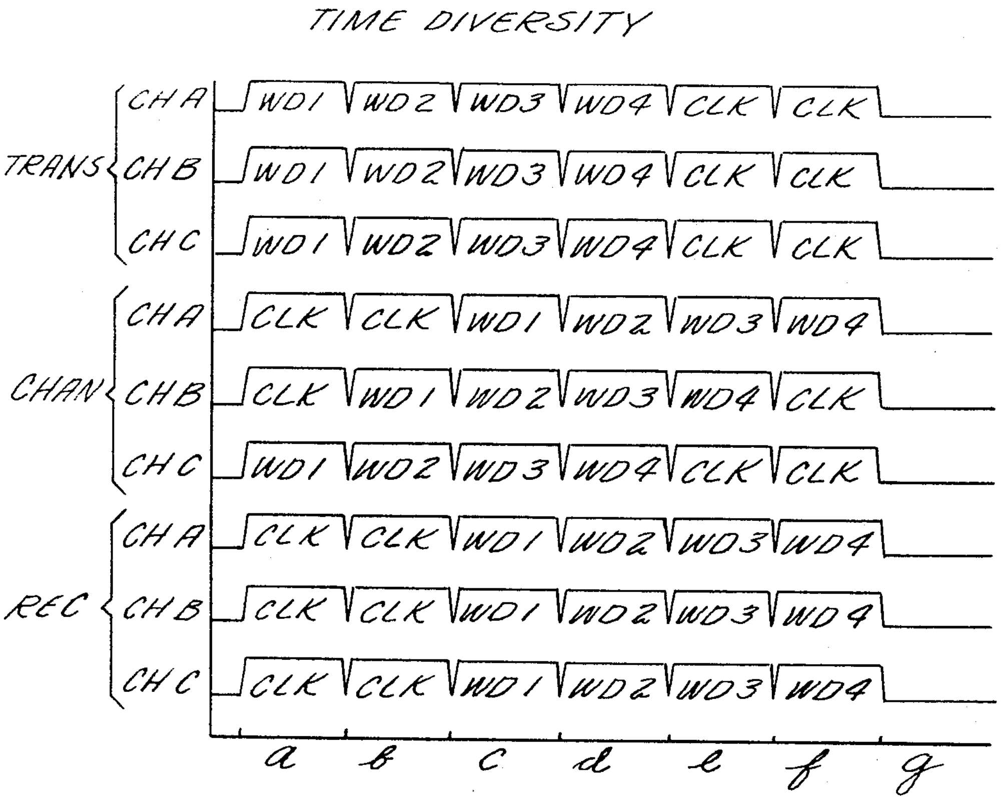
FIG. 4 is a timing diagram illustrative of the time diversity feature of the embodiment of FIGS. 1–3.

The illustration of FIG. 3 is somewhat over simplified so that there is not precisely a one-to-one correspondence with the blocks shown therein, but it does illustrate one of the primary features of the present invention, which is time diversity, multiple-redundance. Each time that a data word is communicated over the channels 36, the originating transmitter independently generates the word in triplicate, each word in the associated generating equipment specifically relating to one of the channels A, B, C. In the present embodiment, only three actual data channels are provided, so all data words are transmitted serially by bit. Each word applied to channel A is delayed by two word times (40); each word applied to channel B is delayed by one word time (42); and each word applied to channel C is undelayed. As illustrated in FIG. 4, this results in the three identical words appearing on channels A, B and C at three diverse adjacent word periods. The word is available on channel C one word time ahead of when it is available on Channel B, which is, in turn, one word time ahead of its availability on channel A. Each receiver is provided with complementary delays on the channel: channel A is provided with no delay, channel B is provided with a one word delay 44–46 and channel C is provided with a two word delay 47–49. This results in all three words being available for response at the respective receiver at the same time, as illustrated in FIG. 4. Consider a transmission from the K unit to the J unit. Therein, each channel is seen transmitting four data words followed by two words of clock signals; the two words of clock signals are used to pump the last of the data words through the two word delay, either two words at the transmitter (channel A) two words at the receiver (channel C), or one word at the transmitter and one word at the receiver (channel B). In this embodiment it is assumed that each data word is 32 bits long and is generated serially. As these bits are generated, bits of channel A are shifted into the two word delay 40, the bits of channel B are shifted into a one word delay 42, and the bits of channel C are shifted directly on the line and to a receiving unit (such as the J unit receiver 30) and into the corresponding two word delay 48. Thus at the end of time period "*a*" in FIG. 4, the first half of the two word delay 40 is full, the one word delay 42 is full, and the first half of the two word delay 48 is full. During time period "*b*," second data words are shifted out, moving the previous words one word closer to the receiver so that at the end of the second time period ("*b*"), all of the word delays 40, 42, 45, 48 are full. In time period "*c*," word one begins shifting out of the word delays on each of the three channels A, B and C, so that the receiver 30 begins responding to the bits of word one; while at the same time word three is being generated and passed into corresponding ones of the word delays 40, 42, 48; and word two is shifted along in the two-word delay 40 between the word delays 42 and 45 and within the two-word delay 48. Each of the words is followed by two clock words which are necessary to shift the data entirely through the word delays. Thus, the receiver 30 responds to the data words exactly two word times after they are generated, bit by bit in serial fashion, by the transmitter 27.

One of the major advantages of time diversity can be illustrated in FIG. 4. Assume that in time period "*d*" a heavy electric disturbance creates noise on all three channels A, B and C at the same time. This noise could significantly alter the signals representative of data words on the channel at that time. But note that channel A is communicating word two while channel B is communicating word three, and channel C is communicating word four. When these words finally reach the receiver, even though word two of channel A may be obliterated, the receiver can determine word two by majority voting of the three channels (as described hereinafter), in which case channels B and C will provide identical bits in each of the serial bit times, and thus recognize the content of channels B and C as being the proper word. Similarly, when word three is being sent, channels A and C each provide a word so a majority vote between them will provide a proper word to the receiver; in the same fashion when the receiver is responding to word four, the bits on channel C may be scrambled, but channels A and B can provide a majority vote, thus indicating the correct bit for word four at the receiver. As described more fully in a copending application of the same assignee, Ser. No. 758,878, entitled MAJORITY DATA SELECTING AND FAULT INDICATING, filed on Sept. 10, 1968 by Games and Bartman, data received serially by bit (from a triple data channel of the type disclosed herein) is compared on a bit by bit basis, and the receiver responds to the bit condition appearing on the majority of the lines (that is, two or three of the lines in agreement). Thus, time diversity combined with majority voting provides a measure of reliability which is orders of magnitude greater than simple redundance of the type known to the art.

Figure 5:
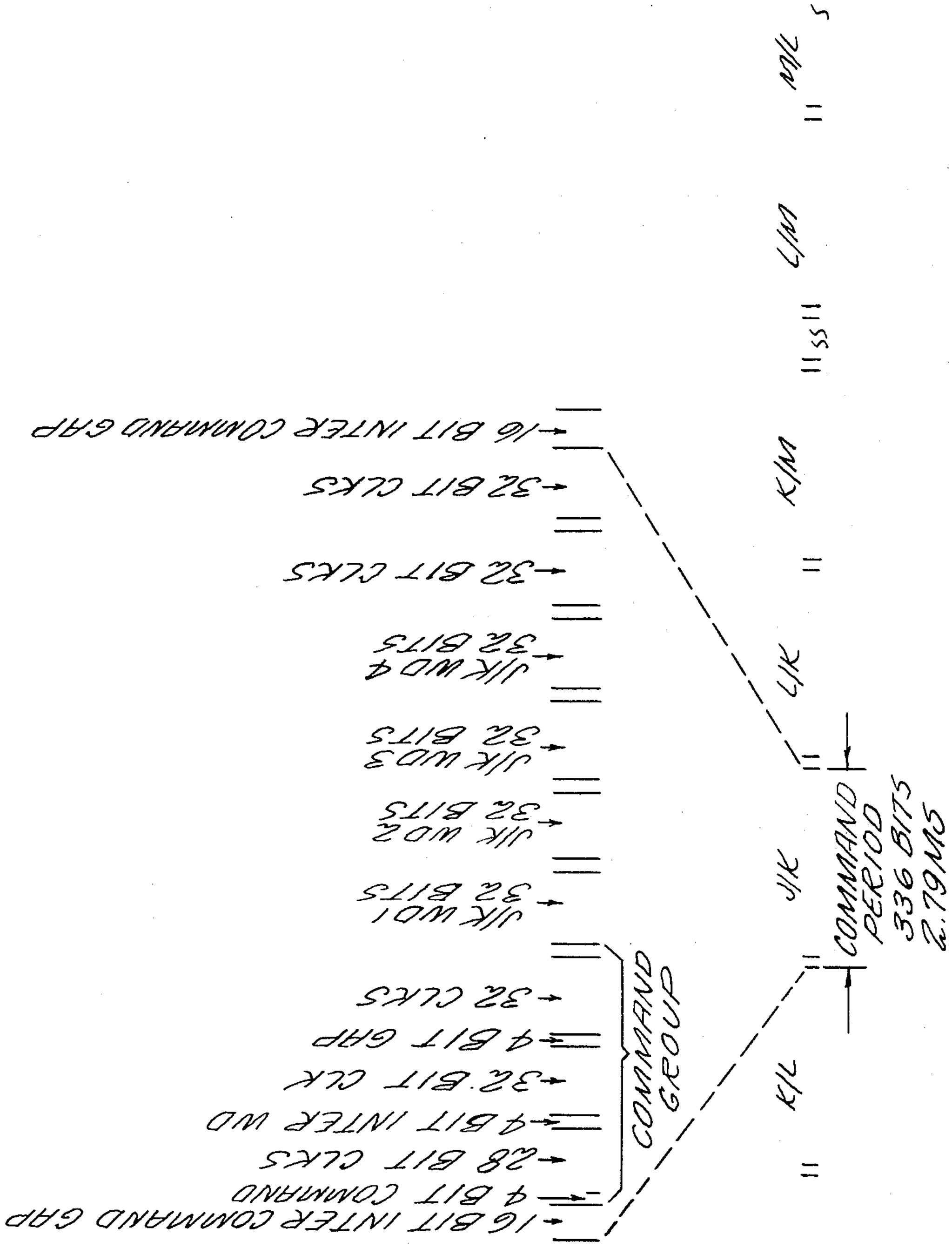
FIG. 5 is a timing diagram illustrating a complete cycle or frame of communication periods.

Another aspect of the present invention is illustrated in FIG. 3. In the present embodiment, it is assumed that four autonomous units may communicate selectively with one another in response to commands generated by one of the units. Commands in the nature of addresses which designate a transmitting unit and a receiving unit are generated, in sequence, by a command generator 38 in the present embodiment. Whenever the channels 36 are quiet for a suitable length of time, the command generator 38 recognizes the condition and will apply a command to the channels 36, which is monitored by all of the receivers 30–33. Each receiver derives clock signals from the channels 36, recognizes the unit designations of each command, and either causes that unit to receive the data subsequently transferred over the channels 36 (if that unit is designated), or causes that unit to ignore the following data if that unit is not so designated. This is illustrated roughly in FIG. 3, by control sections 50–52 associated with each receiver, which determine the commands and can cause the related transmitter to transmit (if that fact is called for by the command to which the receiver has just responded). Referring now briefly to FIGS. 3 and 5, the simplified embodiment of the invention disclosed herein works on a fixed frame of transmissions, within which each unit has an opportunity to transmit to each other unit. In a four unit system of the type used for illustrative purposes herein, this results in 12 different command periods within a frame. Once a frame is complete, another frame follows in the same sequence of command periods. Each command period is separated by an intercommand gap of a time interval equivalent to the time required to send 16 bits of data: in the present embodiment, a 120 KHz clock is assumed, which gives a basic bit time of 8.3 microseconds. Thus the sixteen bit intercommand gap is approximately 133 microseconds. Each of the command periods requires 336 bit times and spans approximately 2.79 milliseconds. This is broken down as follows: first, there is a sixteen bit intercommand gap, followed by three address words, four data words and two clock words, each of the words being separated by a four bit interword gap, as illustrated in FIG. 5. For illustrative purposes, assume a point in the frame of commands wherein L is to transmit to J (L/J). The first occurrence is that the K unit receiver 31 (and more particularly the control portion 50 thereof) senses that there has been no signals on the channels 36 for 16 bit times. The command section 38 of the K unit transmitter 27 recognizes that event to shift out a four bit address standing in a command counter, followed by 28 clock bits to complete a command word; then there will be a four bit interword gap, which the K unit transmitter 27 recognizes to send out a word of 32 additional clock bits; then there will again be no data on the lines, and after a four bit delay, the transmitter will again send out a word of 32 clock bits; the words of clock bits are required in order to shift the command fully through the time diversity delays, as described hereinbefore, so that the command will be received by all of the receivers 30–33 of the system. Assuming that the command is L/J, the L unit receiver 32 will recognize that L is to transmit and its control section 52 will enable the L unit transmitter 28 to commence transmitting. At the same time, the control section 51 of the J unit receiver recognizes the command as indicative that the J unit receiver is to receive data. Thus the link is established between the L unit transmitter and the J unit receiver. (The K unit receiver and the N unit receiver have sensed that they will not be involved in the following data transmission, and become unresponsive to the remainder of the transmission, until such time as another sixteen bit intercommand gap is sensed within the related receiver.) Thereafter, the L unit transmitter will transmit four successive 32 bit words of data, each separated by a four bit interword gap, followed by two, 32 bit words of clock signals, also separated by a four bit interword gaps. When it has done this, it ceases to transmit so that the channels 36 become quiet again. When the channels 36 have been quiet for the 133 microseconds equivalent to 16 bit times, the command section 38 of the K unit transmitter 27 will again sense this fact and send out another four bit command or address. This operation is described in detail with respect to the detailed schematic diagrams hereinafter.

Notice in the above description that, should a given unit be removed from the system, it naturally will apply no signals onto the channels 36; no other event is occurring, so that after a 16 bit intercommand gap has expired with no signals on the channels 36, the command unit will send out the next command. Thus the semi-autonomous operation of all the units in response to a single command generator prevents total system catastrophe, in the event that some unit failed or otherwise cannot respond. In addition, however, as is pointed out more clearly hereinafter, each of the receivers and transmitters comprise essentially triple receivers and triple transmitters, one for each of the channels A, B and C, so that a simple failure should not preclude at least two of the channels being fully operative. As described in the aforementioned copending application, in the event that majority voting indicates that only two out of three of the lines agree at any time, the majority fault indicator of the aforementioned copending application can provide an alarm signal so that proper maintenance may occur before the failure of a second channel from the same unit. Thus, the system is not only more likely to be operational, but in the event that one unit thereof becomes totally inoperational, the other units may nonetheless continue communication amongst themselves in many cases.

UNIT K RECEIVER — FIG. 6

Figure 6:
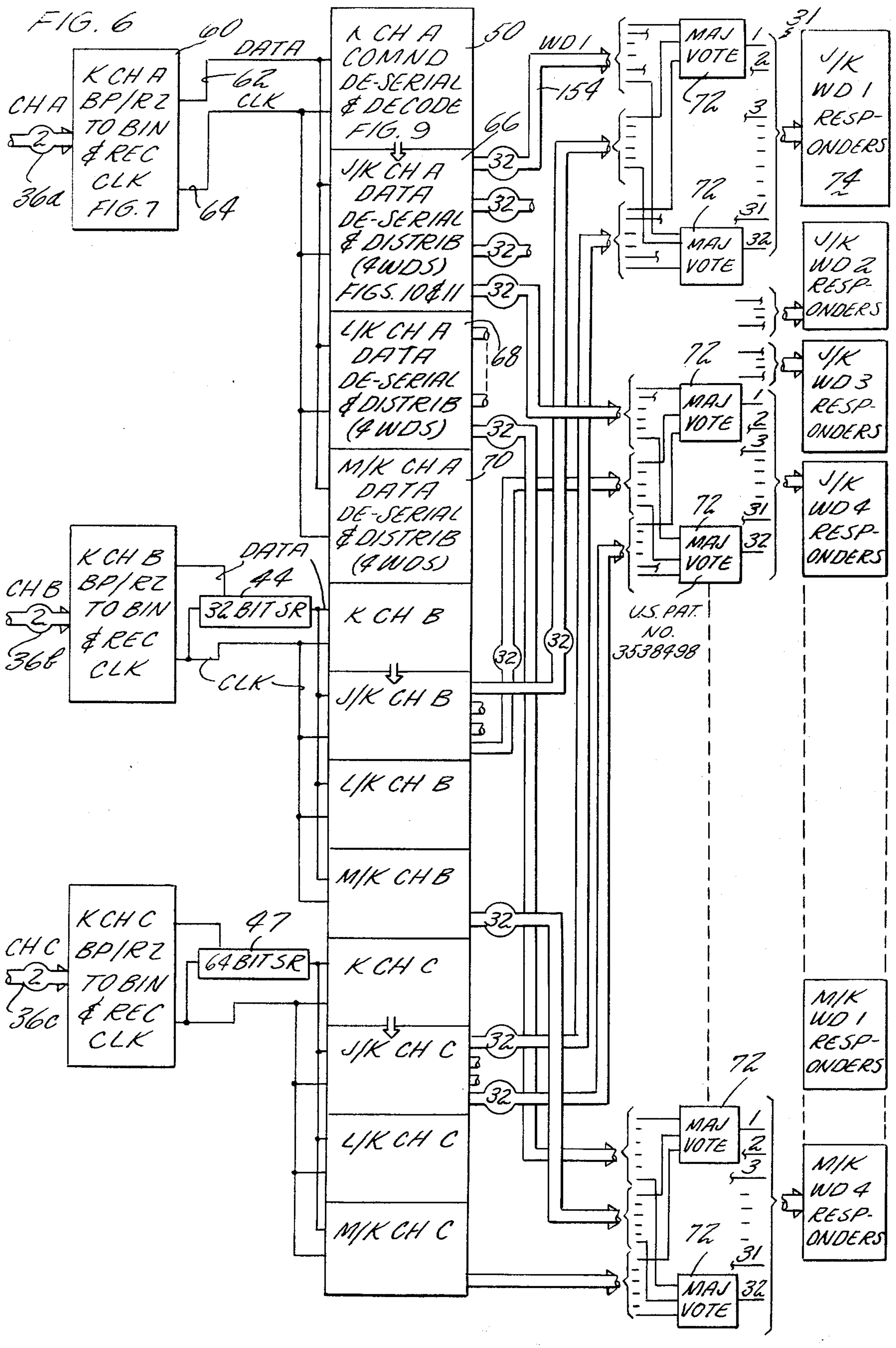
FIG. 6 is a schematic block diagram of the unit K receiver of the embodiment of FIGS. 1–3.

The unit K receiver 31, illustrated in FIG. 6, responds to the three channels 36 to sense when a command involves reception of data by unit K, and when it does, receives serial data words in triplicate, one word for each channel, sorts the words out in triplicate, provides the words in parallel form in triplicate, majority votes the words in triplicate, and applies the words to corresponding responders. Specifically, the input to the unit K receiver comprises the three channels A, B, C. Apparatus will be described, for simplicity, with respect to channel A only. Although shown in FIGS. 2 and 3 as single lines, each of the channels A, B, C comprise complementary pairs of lines 36*a*, 36*b*, 36*c*. The tWo lines of channel A are applied to a K unit, channel A bipolar/return-to-zero, to binary converter and receiver clock circuit 60. This circuit provides a signal in response to a binary ONE on a data line 62 and no signal thereon in response to a binary ZERO. It also supplies a signal on a receiver clock line 64 in response to either a binary ONE or a binary ZERO. It is this clock signal on the line 64 which comprises the data synchronizing for the system. The data and the clock are applied to a K unit channel A command deserializer and decode circuit 50, which is the circuit indicated as the control circuit 50 in FIG. 3. This circuit senses the commands as received, to determine whether unit K should transmit, receive, or ignore the remainder of the command period. The data and clock on lines 62 and 64 are also applied to each of three data deserializer and distributor circuits 66, 68, 70, one corresponding to each of the other three units from which unit K may receive data signals. In response to any command for unit K to receive, the command will specify which unit it will receive from: thus, if the command is J/K, then the unit K receiver energizes the circuit 66 to respond to data on the channels, and does not activate the circuit 68, 70. The circuits 66, 68, 70 provide four words, each in parallel, to be majority voted with the like words of similar circuits for the other two channels 36*b*, 36*c*. Thus bit one of word one received at channel A is majority voted with bit one of word one received at channel B and bit one of word one received at channel C, as indicated by the majority vote circuitry 72. The majority vote circuitry 72 may comprise simple, well-known circuits of the type that provide an output in response to agreement between any two out of the three inputs, and may in addition comprise more sophisticated majority vote apparatus as illustrated in the aforementioned copending application, if desired. However, the present embodiment is described in terms of a simple majority vote circuit that provides no more than an output in response to two or more of three inputs being identical at a given time. The output of each of the majority vote circuits 72 may be applied to a corresponding one or more of a plurality of related responders 74. The responders may comprise digital to analog converters and indicating apparatus so as to take a certain number of the bits of any data word received thereat and convert those bits into a voltage level to be applied to an indicator; some of the bits of the data word may relate to simple bipolar devices, such as switches, and the corresponding responder may comprise a light which would indicate that the switch is closed. On the other hand, a responder may comprise a portion of a control system and a certain number of the bits in a 32 bit word may comprise a digital expression of an analog voltage to be applied to the control circuit to cause it to assume a given position or rate. Thus, anything that can be expressed in the form of electrical signals may be digitally expressed, and may be combined with other things so as to form a digital word of a suitable size for transmission by the system in accordance with the present invention. It should be noted that the embodiment herein has been simplified by assuming four units, each capable of sending four different data words to each of three different units, and each being capable of receiving four different data words from each of the three different units; it is also assumed that all of the data words are of the same, 32 bit size; however, in dependence upon the information which must be sent from one unit to another in an application of the present invention, the number of units, the size of the data words, the number of data words transmittable between one unit and another, and the significance of each of the data words will vary to suit appropriate design parameters.

Figure 10:
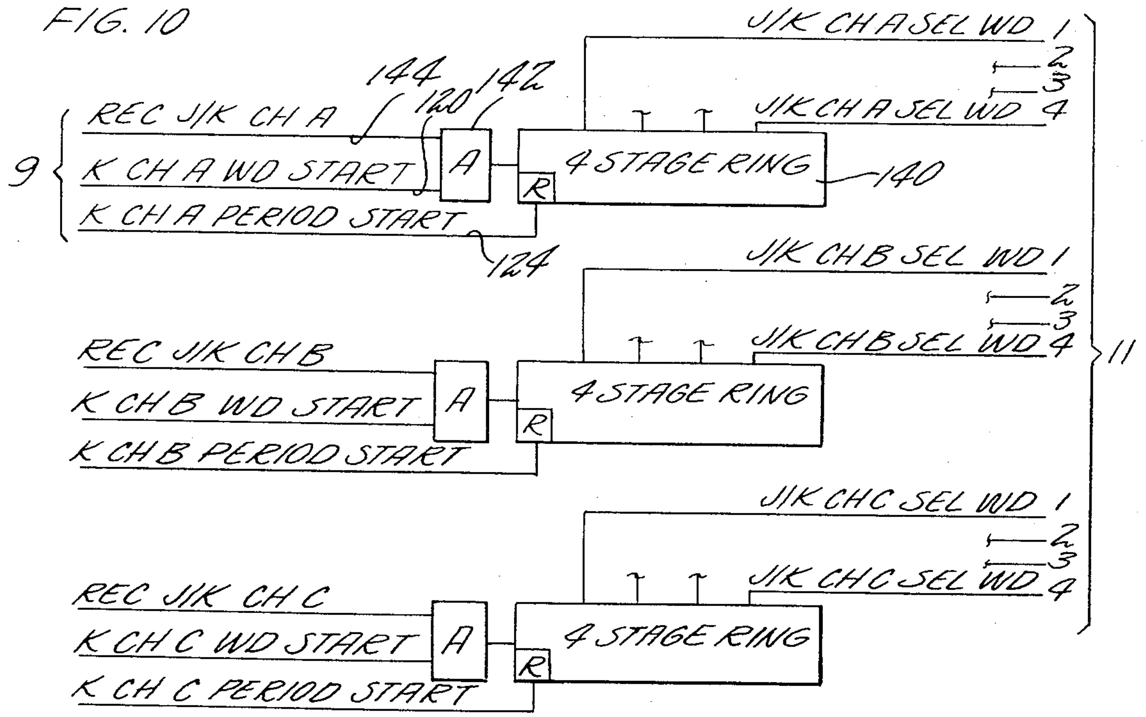
FIG. 10 — Receiver deserializer controls.

The operation of FIG. 6 is real time: that is, as signals are received by the circuit 60 from the channel 36*a*, there is an instantaneous concomitant conversion of these signals to binary data and clock signals which in turn are directly applied to the circuits 50, 66, 68 and 70, the outputs of which are directly applied to the majority vote circuitry 72 and flushed into the responders 74; it should be noted that, at the clock rates in the present embodiment, it is not necessary to provide gating or buffering, as is described more fully with respect to FIG. 10 hereinafter.

Figure 7:
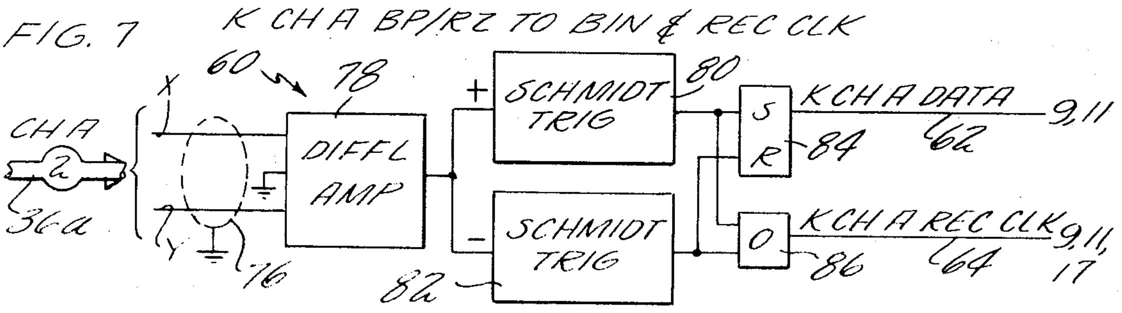
FIG. 7 is a simplified schematic diagram of a bipolar/-return-to-zero, to binary, signal level converter for use in the receiver of FIG. 6.
Figure 8:
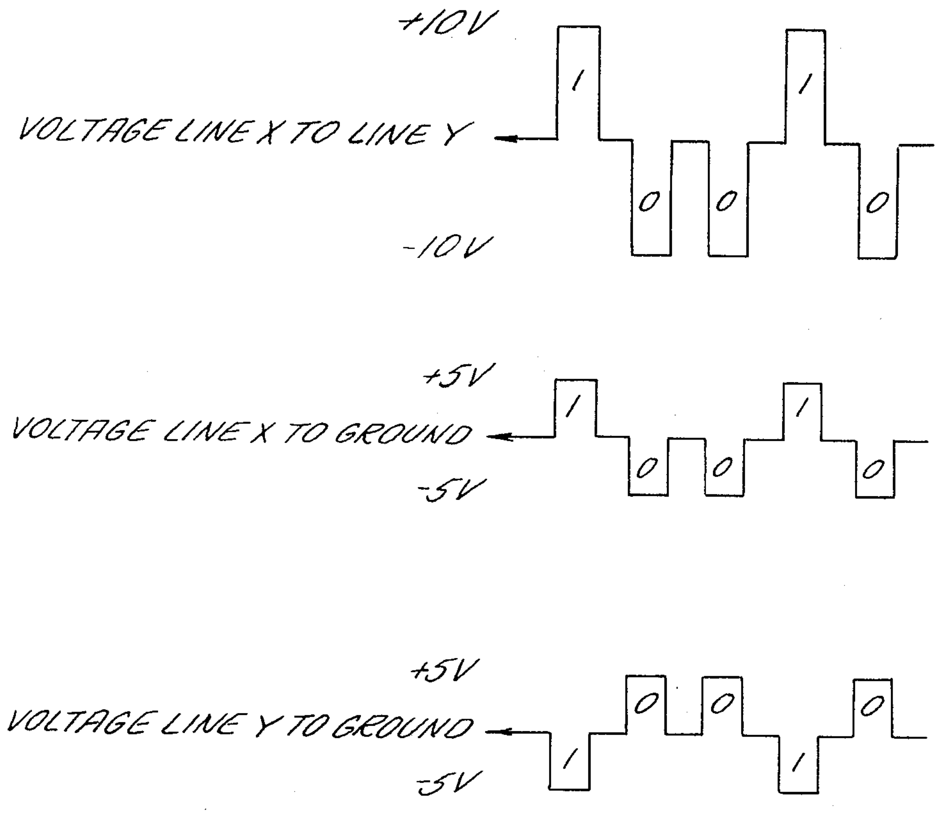
FIG. 8 is a graph illustrating the signal relationships in the converter of FIG. 7; and The remaining figures are block diagrams of portions of the embodiment of FIGS. 1–3 as follows.

The K unit, channel A bipolar/return-to-zero, to binary converter and receiver clock circuit 60 is illustrated in detail in FIGS. 7 and 8. In FIG. 7, the two lines 36a are designated as X and Y. These two lines may conveniently be provided in a single cable having a metallic shield which may be grounded as indicated by the dotted line 76. The lines X, Y are applied to respective inputs of a differential amplifier 78 which may be of any suitable well known type. The differential amplifier 78 will provide either a positive or a negative output in dependence upon the relative polarity of the lines X, Y as illustrated in FIG. 8. The output of the differential amplifier 78 is applied to two similar but opposite pulse shaping and amplifying circuits, which may preferably comprise Schmidt triggers 80, 82. As an example, consider a binary ONE as indicated by the line X being positive with respect to the line Y, and this providing a positive output of the differential amplifier 78: this will cause the Schmidt trigger 80 to provide an output, thereby setting a bistable device such as a simple latch or trigger 84, and providing an output through an OR circuit 86. On the other hand, in the case where the line Y is positive with respect to the line X, this designates a ZERO, as illustrated in FIG. 8, and will cause the differential amplifier to have a negative output; in this case, the Schmidt trigger 82 responds to the amplifier 78 so as to reset the latch 84 and provide a signal through the OR circuit 86. The net effect is that a signal will appear on the K channel A data line 62 only in response to a binary ONE on the channel 36*a*, but a signal will appear on the K channel A receiver clock line 64 in response to either a binary ONE or a binary ZERO on the channel 36*a*. The use of Schmidt triggers is preferred since they can be adjusted to not respond to low level noise, but to recognize only outputs from the differential amplifier which are in excess of a given amplitude, thereby to provide cleaner data signals.

Figure 9:
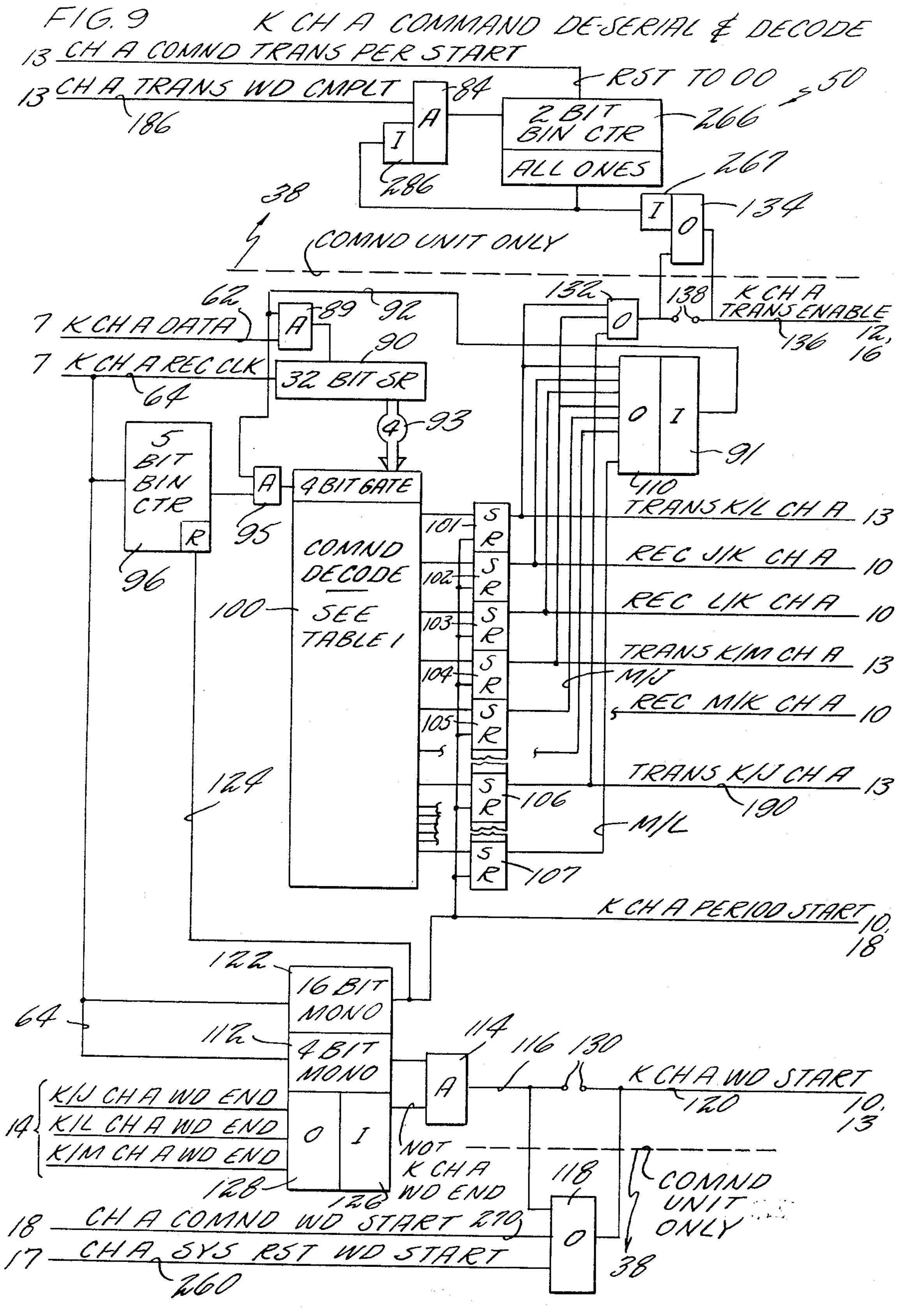
FIG. 9 — Receiver command deserialize and decode circuits.

The K unit, channel A command deserializer and decode circuit 50 is illustrated in FIG. 9. The data on line 62 is applied to an AND circuit 89 which will pass the data to the first stage of a 32 bit shift register 90 provided a signal is present from the output of an inverter 91 on a line 92. As each bit is entered into the 32 bit shift register 90, a clock signal on the line 64 shifts it one position to the right as seen in FIG. 9. This permits this receiver (and all of the other receivers 30, 32, 33, FIG. 1) to respond to an address or command word to determine whether or not the unit is to participate in the following command period. The output of the highest four stages of the 32 bit shift register is applied over a trunk of four lines 93 through a gate 94 to a command decode circuit 100 which may comprise, for instance, a simple binary decode circuit. One exemplary command coding suitable for use in apparatus in accordance herewith is illustrated in Table I:

TABLE I

| COMMAND | BINARY | COMMAND | BINARY |
|---|---|---|---|
| — | 0000 | K/J | 1000 |
| — | 0001 | J/L | 1001 |
| K/L | 0010 | M/K | 1010 |
| J/K | 0011 | L/J | 1011 |
| L/K | 0100 | L/M | 1100 |
| K/M | 0101 | M/L | 1101 |
| M/J | 0110 | (RESET) | 1111 |
| J/M | 0111 | | |

The first two words of 32 bits each, lodged in the shift register 90 are clocks; but they do not cause any response since a code of 0000 does not result in any command being decoded by the command decode circuit 100 (See Table I). The gate 94 is operated by an AND circuit 95 in response to a carry-out or overflow from a five bit binary counter 96 that counts receiver clock signals on line 64. The counter 96 is reset at the start of each word, as described hereinafter, so that it gates the command bits into the decoder 100 after a full word has been received. Once a command has been decoded by the command decode circuit 100, it will provide an output to set a related bistable device or latch 101–107 to register the particular command which was received. Those latches 101–104, 106, etc., which relate to commands involving the K unit provide controlling signals for use elsewhere in the K unit, as described with respect to FIGS. 10 and 13 hereinafter. All of the latches 101–107 provide inputs to an OR circuit 110 which activates the inverter 91 thereby to remove the signal from line 92 and block the AND circuit 89, once any command has been recognized and registered in one of the latches 101–107, including commands for other units such as M/J, J/M, M/L, etc. Thereafter, the command unit will send clocking signals (which is seen hereinafter to comprise ZEROs) until it has sent three complete words onto the channels 36. When the command unit 38 is through sending command signals and clock signals therewith, the channels 36 become quiet, and after there are no signals thereon for a period of time equivalent to about four bit times, which is approximately 25.2 microseconds in the embodiment herein, a four bit monostable multivibrator 112 (bottom of FIG. 9) will time out and operate an AND circuit 114 so as to generate a signal on a line 116 which operates an OR circuit 118 and causes a K channel A word start signal on a line 120. Of course, if the K unit is not one of the units designated in the command, then the equivalent circuitry for one of the other units will operate instead. The AND circuit 114 will operate only if there is a signal from an inverter 126 indicating that there is no output from an OR circuit 128 which is responsive to a plurality of last word signals as are described more fully with respect to FIG. 14 hereinafter. The OR circuit 118 is provided only in the command unit 38, the other units J, L and M do not have an OR circuit 118 but instead have a connection between a pair of terminals 130. Each of the units also includes a 16 bit monostable multivibrator 122 which senses the condition when there has been no signals on the channels 36 for a period of about 133 microseconds. This provides a signal that senses the start of a command period (that is the period of time within which a command is sent, and then one unit transmits to another unit including the periods of time required for clocking signals in order to shift all of the command bits and data word bits through the time diversity apparatus, as described hereinbefore). The sixteen bit monostable multivibrator 122 provides a signal on a K channel A period start line 124 which is utilized to reset the counter 96 and the latches 101–107, and also to reset a receiver word counter in FIG. 10, as is described hereinafter. Note that this signal does not cause the starting of a period, but merely recognizes the starting of a period and resets some of the receiver apparatus so as to make the receiver capable of response to whatever is impressed on the channels 36 in the following period.

Those latches 101, 104, 106 which indicate that the K unit is to transmit have their outputs connected to another OR circuit 132, the output of which operates an OR circuit 134 to develop a signal on a K channel A transmit enable line 136. The OR circuit 134 appears only in the command unit 38, and the other units of the system (J, L and M) do not have an OR circuit 134, but instead have a connection between a pair of terminals 138. The remaining circuitry at the top of FIG. 9 is described with respect to FIG. 18 hereinafter.

In FIG. 10 are shown the receiver deserializer controls. Basically, the circuitry of FIG. 10 merely provides, for each channel in the K unit receiver, a count of the words received so that each word received can be properly allocated to the correct transponders as indicated in FIG. 6 hereinbefore. The incoming words are counted by a four stage ring 140 which is reset at the start of each command period by the K channel A period start signal on the line 124. Thereafter, at the start of each word transmission period, the K channel A word start signal on line 120 will cause an AND circuit 142 to advance the ring 140, provided that the command decoder indicates that K is receiving from J, by presenting a signal on a receive J/K channel A line 144. Thus, when unit K is receiving data for those responders operated by unit J, the four words in the transmission are counted with respect to channel A by the circuitry just described. The remaining circuitry of FIG. 10 is identical to that described, but relates to channels B and C of the unit K receiver. Similar circuitry is provided for channels A, B and C of the L/K and M/K receiving circuitry, as indicated generally in FIG. 6.

Figure 11:
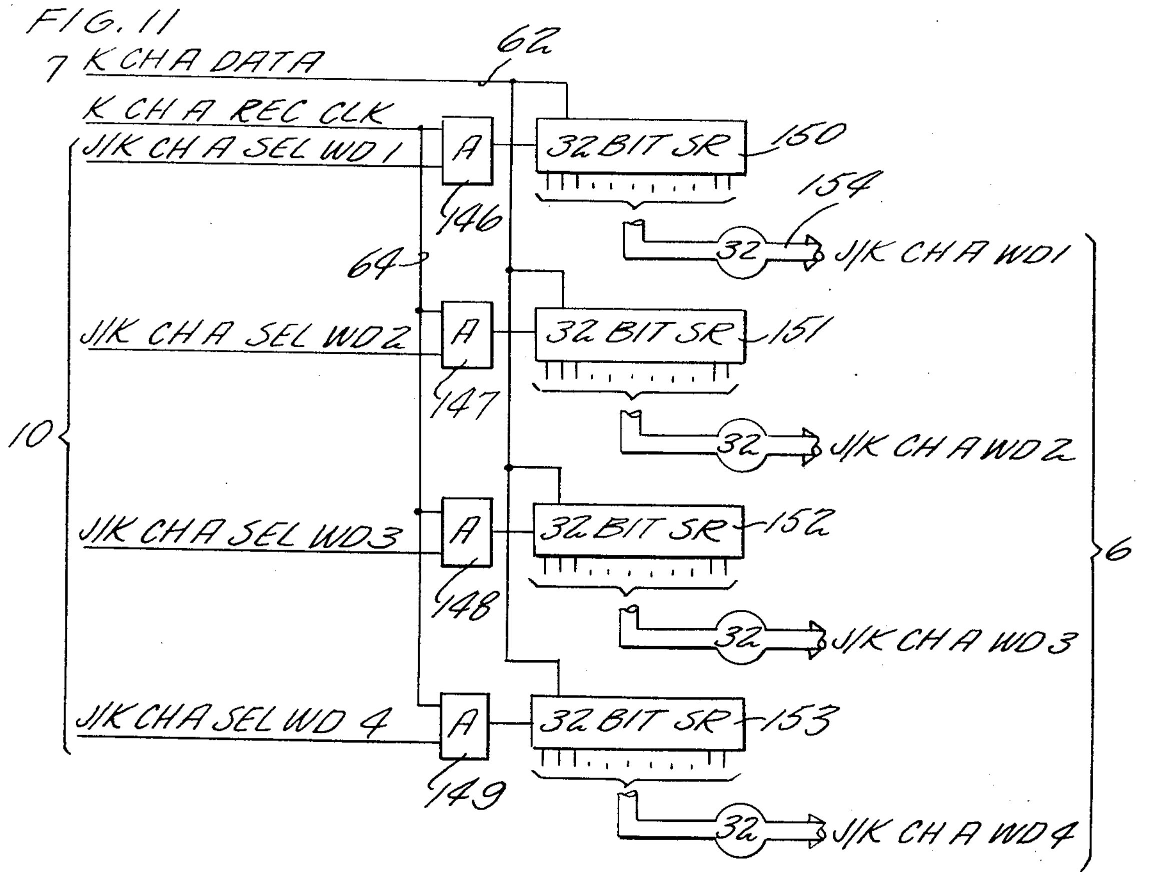
FIG. 11 — Receiver deserializing registers.

The word select signals generated in FIG. 10 are applied to a plurality of AND circuits 146–149 (FIG. 11), respectively, which circuits are also responsive to the K channel A receiver clock signals on line 64. The output of each AND circuit is utilized to shift a corresponding 32 bit shift register 150–153. The low order stage of each shift register is responsive to the K channel A data signals on the line 62. Thus during word one time, either a ONE or a ZERO is inserted into the low order position of the shift register 150 and immediately shifted one position to the right, once for each bit time. The output of the shift register 150 comprises a full word of 32 bit lines 154 which are applied to related ones of the majority vote circuits 72, the output of which in turn are applied to the J/K word one responders 74, as illustrated in FIG. 6. The other shift registers 151–153 are similarly applied to corresponding ones of the majority vote circuits 72 (FIG. 6), the outputs of which provide the inputs to the J/K word two, J/K word three and J/K word four responders.

Unit K Transmitter — FIGS. 12–16

Figure 12:
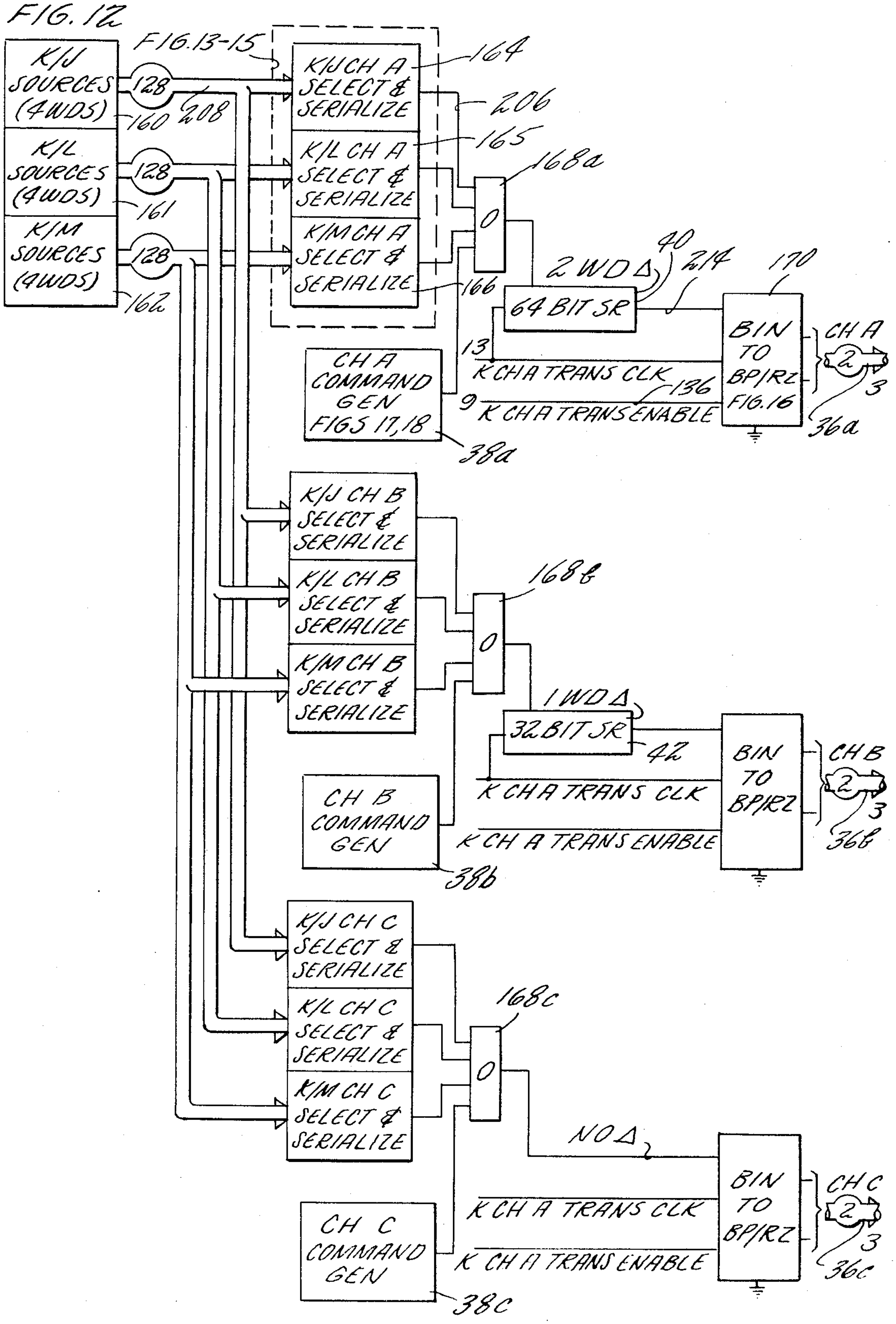
FIG. 12 — Unit K transmitter.

The transmitter section of unit K not only includes the normal transmitter functions of the type utilized in the other three units, but also includes the command generator 38. As seen in FIG. 12, the command generator 38 actually comprises three distinct command generators **38*a*, 38*b*, 38*c*, one respectfully corresponding to each of the three channels 36*a*, 36*b*, 36*c*. The command generators are described in more detail with respect to FIGS. 17 and 18 hereinafter, but it can be seen in FIG. 12 that they merely supply an alternative source of data for transmission by the K unit transmitter. In the upper left of FIG. 12 are shown three types of data sources 160–162. These are the counterparts of the responders illustrated in the upper right of FIG. 6. These sources may comprise analog signals indicative of fuel levels, aerodynamic surface positions, etc., unitary bipolar switch positions, or digital indications of altitude or other flight parameters. When analog, the analog signal level is converted at the source to digital. Each of the sources is applied to a corresponding circuit 164–166 in each of the three channels 36*a*–36*c*. Each of the circuits is operative to gate the digital signals from a related source in response to a proper command and to serialize the digital word received at the circuits 164–166 from the related source 160–162. These circuits are described in more detail with respect to FIGS. 13–15 hereinafter. The outputs of the circuits 164–166 are passed through an OR circuit 168, together with the output of the related command generator 38*a* into the lowest ordered stage of the two-word delay 40, which comprises a 64 bit shift register. In the case of channel B, the output of an OR circuit 168*b* is applied to the one-word delay 42; and in the case of channel C, the output of an OR circuit 168c is applied directly to the output circuits without passing through a delay circuit. The output of each channel of the unit K transmitter comprises a binary, to bipolar/return-to-zero converter circuit 170, which is a corollary to the circuit 60 illustrated in FIG. 7. This is described in more detail with respect to FIG. 16** hereinafter.

Figure 13:
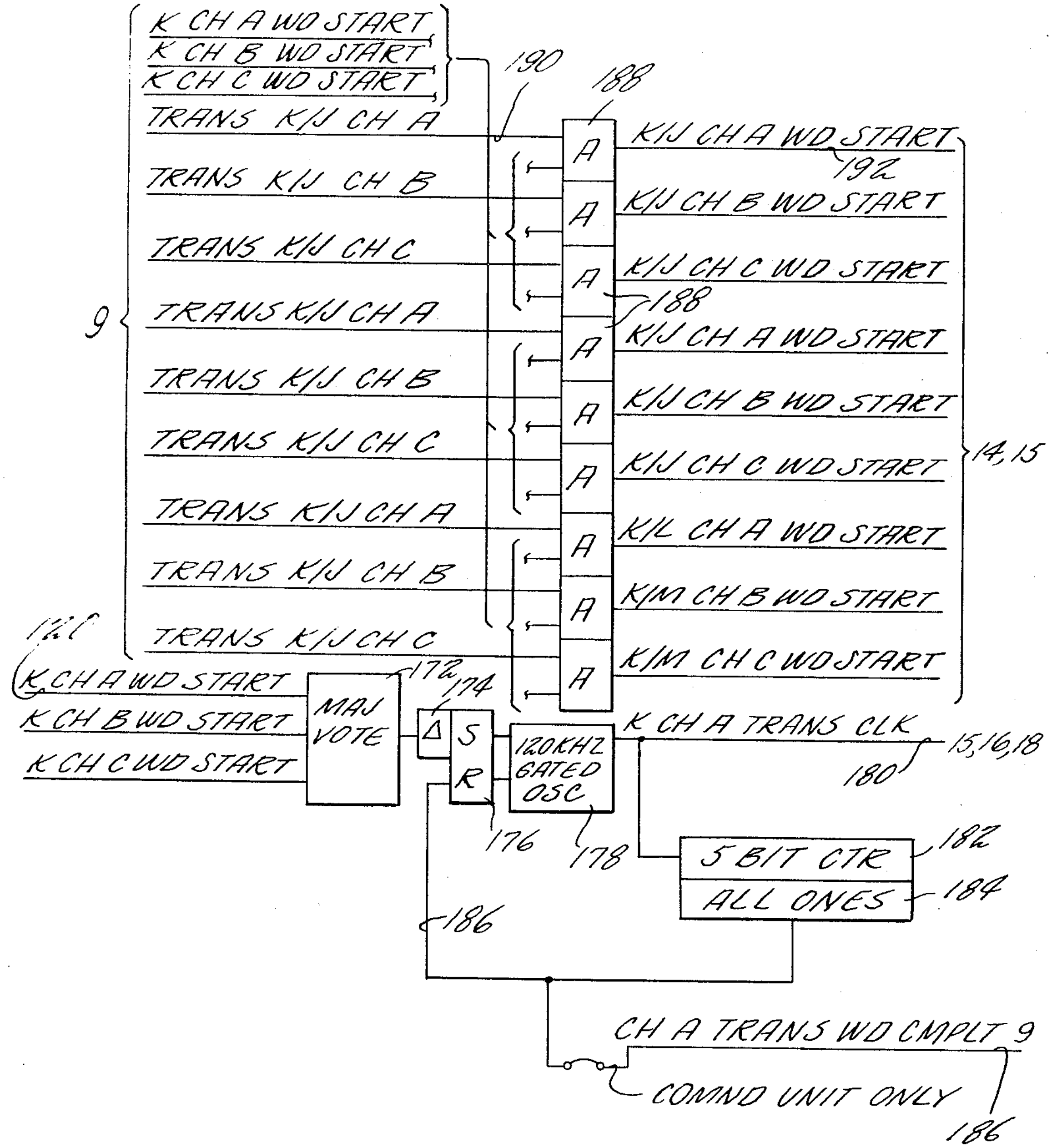
FIG. 13 — Transmitter selection controls and clocks.

In FIG. 13, the word start signals for each of the channels, such as the K channel A word start signal on the line 120 are applied to a majority vote circuit 172, which is the same type as the majority vote circuit 72 illustrated in FIG. 6. The output of the majority vote circuit indicates that each of the independent circuits for channels A, B and C in the K unit transmitter have received word start signals. When this occurs, the majority vote circuit 172, and similar majority vote circuits in channels B and C (which also majority-vote the word start signals for channels A, B and C), enables the starting of the transmitter clocks in synchronism with one another. This ensures that the bit times for each of the three channels are synchronous, at least at the start of a 32 bit word, whereby the bits will be substantially in synchronism when majority voted in the receiving unit (as illustrated with respect to FIG. 6, hereinbefore). The output of the majority vote circuit 172 is applied through a small delay circuit 174 to set a bistable device such as a trigger or latch 176, which is connected to a gated oscillator 178 which may operate, for instance at about 120 KHz. The output of the gated oscillator comprises the K unit channel A transmit clock on the line 180, which is utilized to actually gate the digital signals onto the channels 36. The oscillator 178 is allowed to provide 32 clock signals and it is then shut off. This is achieved by a five bit binary counter 182 having an all-ones detector 184, the output of which resets the latch 176, and, in the command unit, also provides a channel A transmit word complete signal on a line 186. Note the relationship between the transmit clock in FIG. 13 and the four bit mono 142 in FIG. 9. After 32 bits have been gated out, the system essentially goes quiescent until the four bit mono 112 (FIG. 9) times out and provides additional word start signals. These are applied to the majority vote circuits 172 so as to start off the clocks for each of three channels in synchronism at the start of each 32 bit word. The delay circuit 174 allows further settling of the system after all three word start signals are available; it may be suitably adjusted in any given system. This is an important feature of the present invention, which contributes to the data synchronizing utilized herein. The word start signals, such as the channel A word start signal on line 120, are also applied to corresponding AND circuits 188 in which these signals are combined with command decode signals, such as the transmit K/J channel A signal on a line 190, generated by the command decode circuit 100 in the K unit receiver, as illustrated in FIG. 9. Thus, signals at the output of the AND circuits 188 comprise individual word start signals for the particular command involved, there being one for each of the three channels for any given command, such as the K/J channel A word start signal on a line 192.

Figure 14:
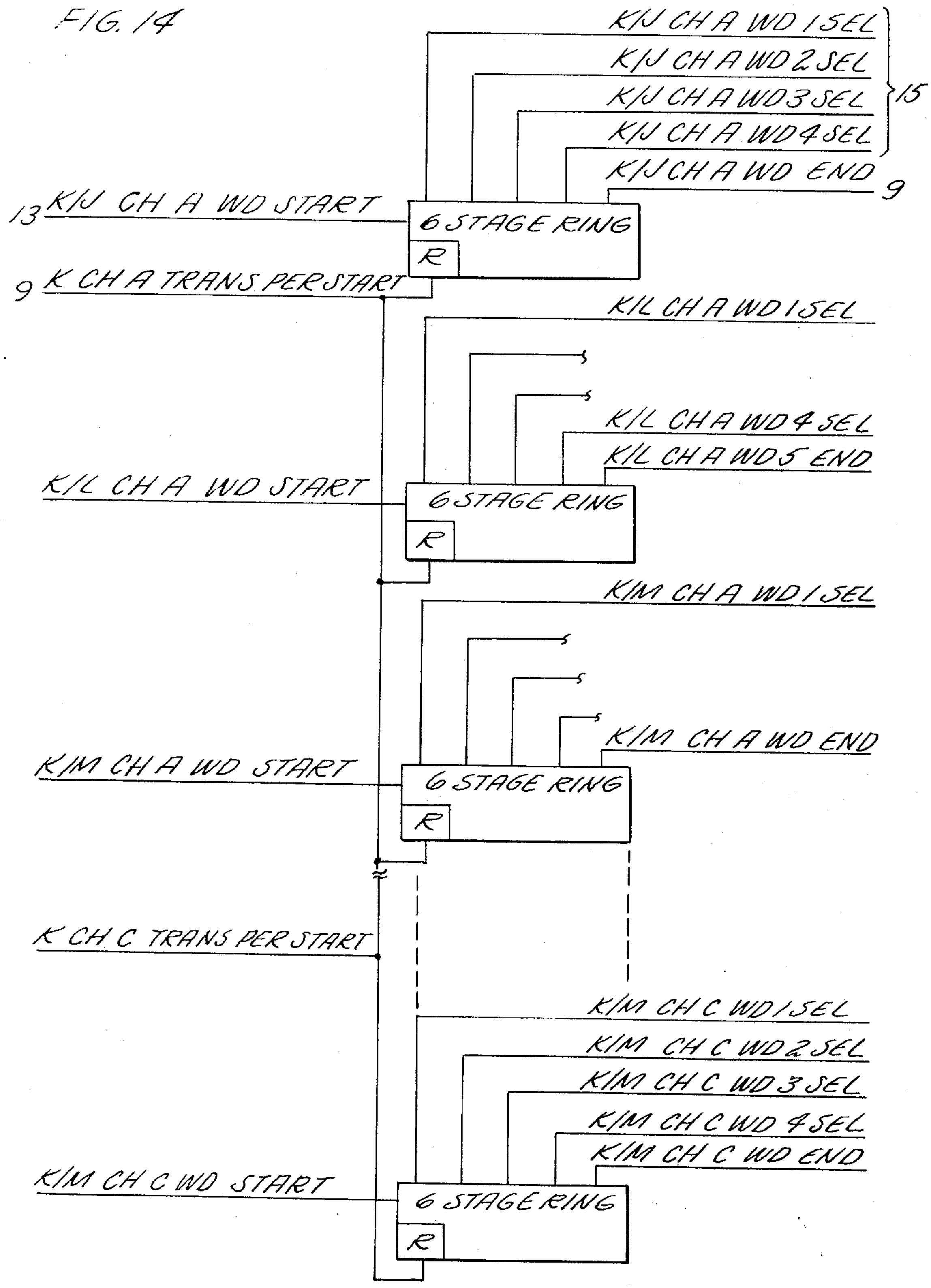
FIG. 14 — Transmitter serializing controls.

The specific word start signals generated in FIG. 13 are applied to word select circuitry in FIG. 14. Therein, at the start of any communication period, the K channel A period start signal on the line 124 will reset a six state ring 194 which counts the four different words transmitted from unit K to unit J. The signal on line 124 also resets six stage rings 195, 196 relating to K unit transmissions to units L and M respectively. Thereafter, for each word started, the related six stage ring will be advanced by one count. For instance, in a transmission from unit K to unit J, the ring 194 will be advanced for each word start signal, but the rings 195 and 196 will not be advanced. Each of the first four stages of the rings 194–196 comprise individual word select signals which are utilized to select a particular group of sources for serialization and application to the channels 36, as described briefly with respect to FIG. 12 hereinbefore. The fifth stage of each ring is not utilized, and the sixth stage of each ring is utilized to generate a last word signal, such as the K/J channel A last word signal on a line 198. This provides operation as illustrated in FIG. 5 wherein, after four words of data are transmitted (in response to signals on lines 196 to the first four stages of the ring 194), two more words of clocks will be sent, after which transmission is terminated as a result of the last word signal on the line 198 blocking further generation of word start signals in FIG. 9 following the time out of four bit mono 112 (which is the interword gap).

Figure 15:
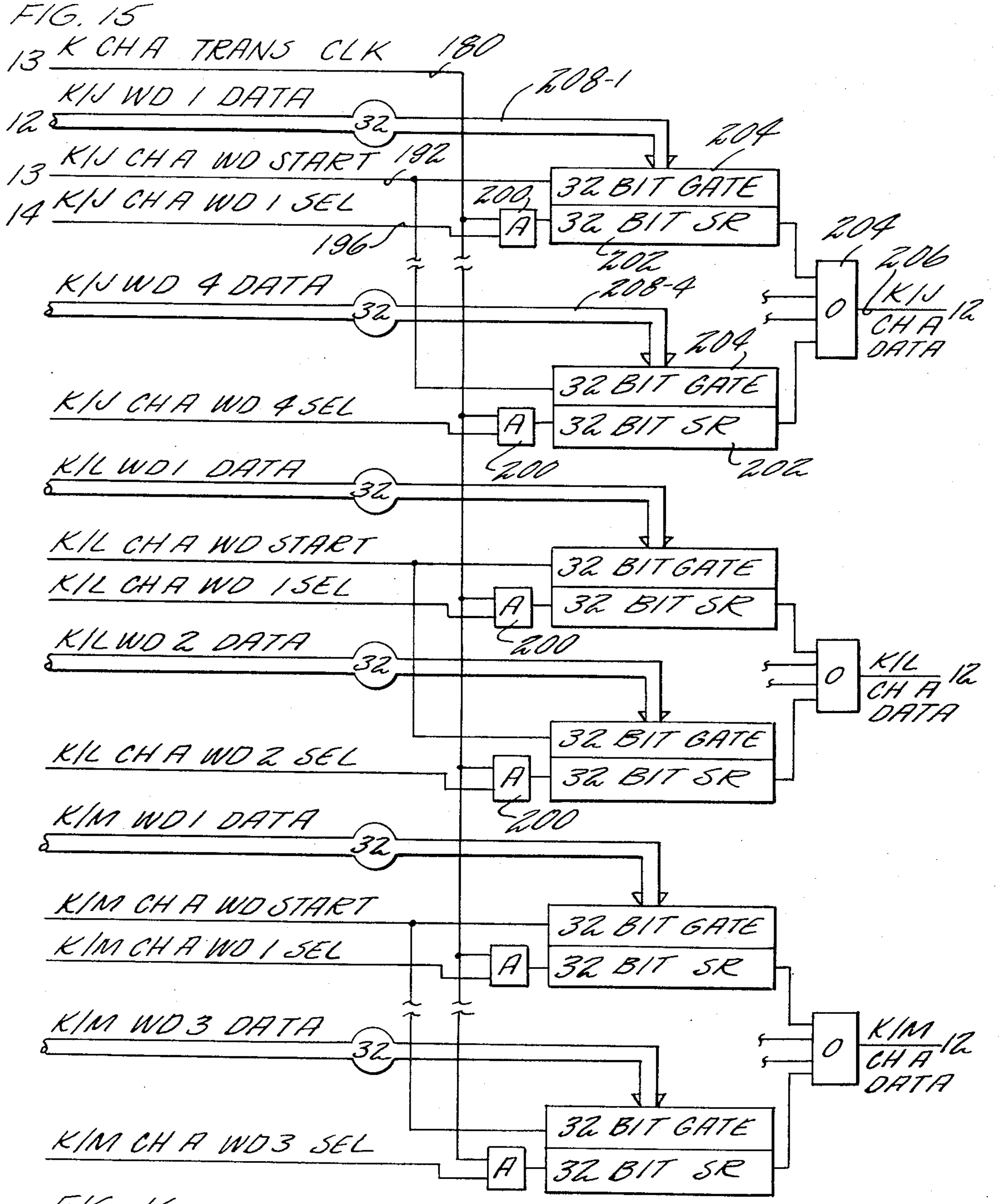
FIG. 15 — Transmitter serializing registers.
Figure 16:
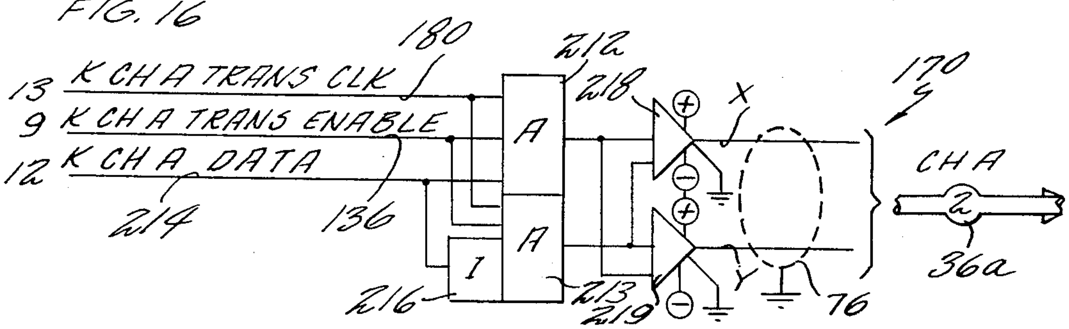
FIG. 16 — Transmitter binary-to-bipolar/return to zero signal level converter.

The select signals generated in FIG. 14 are applied in FIG. 15 to a plurality of AND circuits 200 to selectively gate the K channel A transmit clock signals on the line 180 to shift a corresponding 32 bit shift register 202 thereby causing data from a related one of the sources 160 (FIG. 12) through a corresponding OR circuit 204 (FIG. 15) onto a line 206 through the OR circuit 168 to the two-word delay 40 (FIG. 12). The 32 bit shift register 202, and similar shift registers related to the four words of sources corresponding to a transmission from K to J, are loaded from the respective sources at a related one of each word start by the K/J channel A word start signal generated in FIG. 13 on the line 192. This activates related 32 bit gates 204 to cause data from the K/J sources on a trunk of 32 lines 208–1 to be gated into the shift register 202. Signals from the other three words of K/J sources (FIG. 12) are similarly gated from a related 32 bit trunk of lines, such as lines 208–4, into the related shift register 202. Thereafter, one of the shift registers will be clocked by the transmit clock signals on the line 180 and, in dependence upon which of the AND circuits 200 has been energized by the word select signals (such as the K/J channel A word one select signal on the line 196).

The serial data bits emerging from the word delays 40, 42 (FIG. 12) and the OR circuit **168*c* are binary in nature: that is, during any bit time, the presence of a signal indicates a binary ONE whereas the absence of a signal indicates a binary ZERO. These signals are converted to bipolar/return-to-zero signals of the type described with respect to FIGS. 7 and 8 hereinbefore by the binary to bipolar/return-to-zero converter 170, illustrated in FIG. 16. Binary output data is recognized in FIG. 16 by a pair of complementary AND circuits 212, 213 each of which is operative only during a K unit channel A transmission indicated by a signal on the K channel A transmit enable line 136, and are gated by the K channel A transmit clock on the line 180. When the AND circuits are gated, it depends on whether there is a ONE or a ZERO on the K channel A data line 214. If there is a binary ONE, the AND circuit 212 will operate; if there is a binary ZERO, then an inverter 216 will operate the AND circuit 213. The output of AND circuit 212 is applied to the positive side of a differential line driver 218 so as to cause a positive signal on the X line of the channel A pair of lines 36*a*, and is also applied to the minus input of a differential line driver 219 so as to cause the Y line to become negative. Thus there is established a binary ONE with the X line more positive than the Y line. On the other hand if the AND circuit 213 operates, it energizes the plus input of the differential line driver 219 and the minus input of the differential line driver 218,** thereby to establish a ZERO on the line with the Y line more positive than the X line.

COMMAND GENERATOR AND SYSTEM OPERATION — FIGS. 17 AND 18; TOP OF FIG. 9

The system in accordance herewith is designed primarily as a highly reliable communication system, which may be used, for instance, in a multiplexing system which does away with the need for hard wiring between all sources and responders. In any environment, particularly in airborn applications, it is likely that the system should be under power and operating whenever there is power on the aircraft or other environment. Therefore, the present embodiment is designed to settle down and commence operations upon the occurrence of power first being applied.

Figure 17:
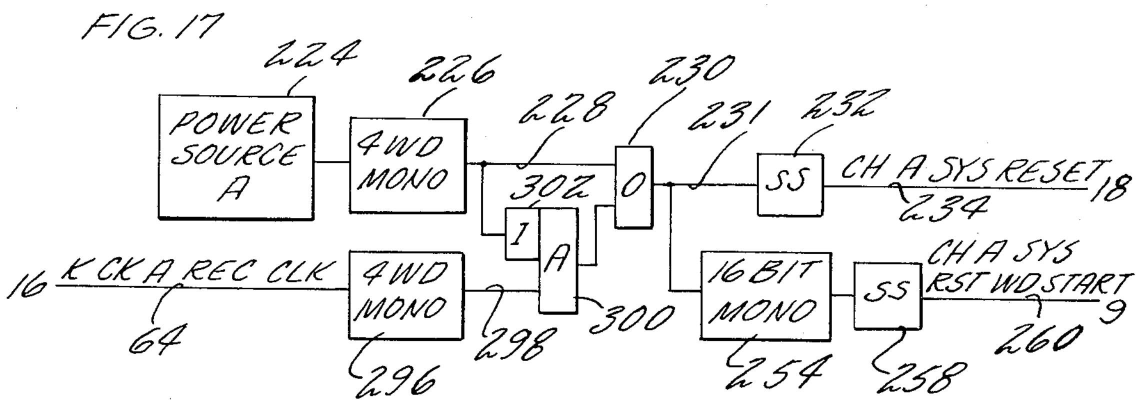
FIG. 17 — Command unit power on reset circuit.

In FIG. 17, circuitry recognizes the appearance of power when the system is first turned on; it is assumed in the present embodiment that three independent power sources are available (for redundant reliability), although the system will operate without the redundancy feature on a single power supply if desired. In FIG. 17, a power source 224 for channel A operates a monostable multivibrator 226 having a time out equivalent to about four words, which in the present embodiment is about 1.07 milliseconds. Therefore, at any time following 1.07 milliseconds after power is initially turned on, a signal will be available on a line 228 to cause an OR circuit 230 to operate a single shot 232 in order to generate a channel A system reset pulse on a line 234. This pulse is applied in FIG. 18 to reset a four bit counter 236 utilized herein as a command generator. It should be understood that although only 12 commands are used in the present embodiment, which therefore can be achieved with a four bit binary counter, a significantly larger number of commands may be employed in any system provided a suitably larger counter is utilized. The reset signal on the line 234 sets the command generator 236 to a count of all ONEs, which is seen in Table I to be the equivalent of the highest-ordered command plus one. Once the command generator 236 is set to all ones, its output on a trunk of four lines 238 is applied to a frame complete detector 240 which senses the all ONEs condition and provides a channel A frame complete signal on a line 242. This signal is applied to a majority vote circuit 244 (which is of the same type as the majority vote circuits 72 illustrated in FIG. 6 hereinbefore), the output of which is passed through a frame stop switch 246 to a forced input of the command generator 236. This forced input can force the command generator to any setting which is less than the binary value of the lowest ordered command, or first command, which it must generate. This is so because it is immaterial if it attempts to signal units which are not in the system, losing only a few milliseconds in the attempt. Eventually it will step to a setting equal to the lowest ordered command, and the device identified in the command will then take over operation of the system for one transmission period. The majority vote circuit 244 will operate only provided two out of three inputs are present, plus causing synchronizing of the channel A control of FIG. 18 with similar controls for channel B and/or channel C. The Channel A frame complete signal on the line 242 is simultaneously applied to an inverter which blocks an AND circuit 250, temporarily.

Figure 18:
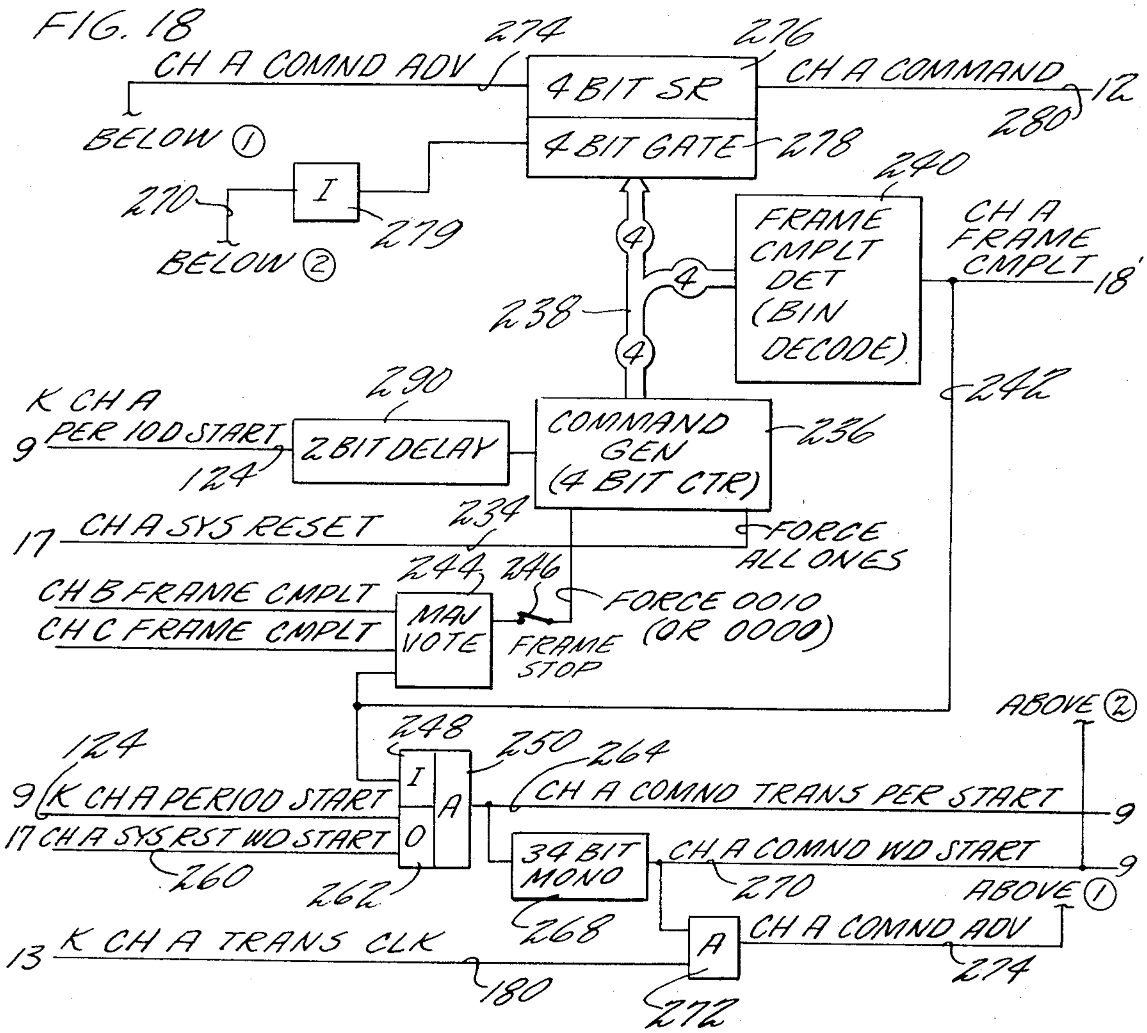
FIG. 18 — Command generator circuit.

Since all of these operations take some time, the system is prevented from trying to proceed until a sufficient lapse of time so as to allow all three majority vote circuits (such as the channel A majority vote circuit 244) to settle down. This is achieved in FIG. 17 by the signal on the line 231 also being applied to a 16 bit monostable multivibrator 254, which times out in about 133 microseconds; when it times out, it applies a signal on a line 256 suitable to cause a signal shot 258 to generate a channel A system reset word start pulse on a line 260. In FIG. 9, the signal on the line 260 is applied to the OR circuit 118 to generate the very first K channel A word start signal on line 120. This signal is applied in FIG. 13 to the majority vote circuit 172 for the purpose of starting the K channel A transmit clock 178. The channel A system reset word start signal on the line 260 is also supplied in FIG. 18 to an OR circuit 262 which can now operate the AND circuit 250, once the majority vote circuit 244 has forced the setting of the command generator 236 to the first command count, thereby removing the output from the frame complete detector 240. The AND circuit 254 generates a channel A command transmit period start signal on a line 264 which is utilized in FIG. 9 to reset a two bit binary counter 266 to a count of ZERO-ZERO. Resetting of the counter 266 to ZERO-ZERO enables an inverter 267 to operate an OR circuit 134 thereby to generate the K channel A transmit enable signal on the line 136, which is utilized in FIG. 16 to enable transmit clock signals to gate commands out of the transmitter and onto the channels 170, as described hereinbefore with respect to data signals. As is described hereinafter, the counter 266 counts the address word and the two words of clock signals needed to push the address word through the time diversity word delays in the system. In FIG. 18, the channel A command transmit period start signal on the line 264 is also applied to a 34 bit monostable multivibrator 268 which provides a channel A command word start signal on a line 270, for something over one complete word time, immediately following the generation of the channel A system reset word start signal on the line 260. This is applied to an AND circuit 272 which in turn gates K channel A transmit clock signals on the line 280 so as to provide channel A command advance pulses on a line 274, which are utilized at the top of FIG. 18 to shift a four bit command out of a four bit shift register 276. The four bit shift register 276 is loaded from the command generator 236 when a four bit gate 278 is enabled by a signal from an inverter 279. The inverter 279 responds to the channel A command word start signal on the line 270, so that during the period of time that the address is actually being shifted out of the shift register 276, it is isolated from the command generator 236 by the lack of an output from the inverter 279 having blocked the gate 278. The output of the four bit shift register 276 comprises the channel A command signals on a line 280, which are passed through the OR circuit **168*a* (FIG. 12) and onto the channel in the same fashion as data, as described hereinbefore. Since this puts data on the channel 36, each of the receivers, including the K unit receiver, is now receiving data clock signals from the channels as described hereinbefore. The four bit shift register 276 will shift out the four bit address and, thereafter, ZEROs will be shifted out of the shift register 276 and through the time diversity in FIG. 12 to the channels 36 until 32 bits in all have been shifted (as illustrated in FIG. 5). When 32 bits have been shifted out, the clock circuit at the bottom of FIG. 13 will be deactivated by the all-ONEs detector 184, resetting the latch 176 which removes the gate from the oscillator 178, in the same fashion as described hereinbefore with respect to data transmissions. Once the K channel A transmit clock signal is no longer available on the line 180 (FIG.13), it will no longer supply the channel A command advance signals on the line 274 (FIG. 18). Thereafter, the channels 36 become quiet. The all-ONEs detector 184 also supplies the channel A transmit word complete signal on the line 186 which is applied, at the top of FIG. 9, to operate an AND circuit 284** and advance the setting of the two bit binary counter from ZERO-ZERO to ZERO-ONE.

When the channels 36 become quiet, the four bit monostable multivibrator 112 (bottom of FIG. 9) will pass a signal to the AND circuit 114 which is also receiving a signal from the inverter 126, since there are no inputs to the OR circuit 128 at this time. The AND circuit 114 provides a signal on the line 116 so that the OR circuit 118 generates a second K channel A word start signal on the line 120. This is applied to the majority vote circuit 172 in FIG. 13 so as to again cause the K channel A transmit clock signals to appear on the line 180; since the two bit binary counter 266 at the top of FIG. 9 has not yet reached a state of all ONEs, the OR circuit 134 is still supplying a K channel A transmit enable signal on the line 136 so that, with the transmit clock running, the binary to bipolar/return-to-zero circuit of FIG. 16 will again gate ZEROs out onto the channels; when 32 zeros have been gated onto the channels 36, the clock circuit at the bottom of FIG. 13 will sense the all ONEs condition and generate the channel A transmit word complete signal on the line 186, which shuts off the clock and which provides another input to the two bit binary counter 266 to advance its setting from ZERO-ONE to ONE-ZERO. With the clock shut off, the channels 36 become quiet, so once again the four bit mono 112 (at the bottom of FIG. 9) will time out, causing a third K channel A word start signal on the line 120 which in turn causes the clock at the bottom of FIG. 13 to start up. The clock will cause 32 more ZEROs to be transferred through the circuit of FIG. 16 onto the channels, after which the all-ONEs detector 184 (bottom of FIG. 13) will cause a third channel A transmit word complete signal on the line 186, which shuts off the clock and which is applied to the top of FIG. 9 to cause the AND circuit 284 to again advance the two bit binary counter 266. This time the counter 266 advances to a state of all ONEs, thereby providing an input to the inverter 267 and to another inverter 286, which blocks the OR circuit 134 from generating any further K channel A transmit enable signals on the line 136, unless they are generated in response to the OR circuit 132 as a result of data transmissions. The inverter 286 prevents any further advancement of the two bit binary counter 266 until the next command transmission period. As a result of having sent three complete words of signals (a four bit command signal followed by 28 ZEROs in a first word, and two additional words of 32 ZEROs each, as seen in FIG. 5), all of the receivers 30–33 ( FIG. 1) in the entire system have the address lodged in their respective command deserialize and decode circuits, such as the circuit 50 illustrated in FIG. 9. Since 32 bits have been read therein, each of these have had the highest order four bits (where the four bit command is lodged) transferred to the command decode circuit 100, so one of the latches 101–107 has been set in each of the units. Assume for the time being that the command just sent is a command for the K unit to transmit to the L unit. This will cause the latch 101 (center of FIG. 9) to become set, thereby providing an input to the OR circuit 110 and the OR circuit 132. The inverter 91 thus blocks receipt of any further signals into the 32 bit shift register 90, and the OR circuit 132 provides the K channel A transmit enable signal on the line 136 through the OR circuit 134. During this period of time, the four bit monostable multivibrator 112 at the bottom of FIG. 9 times out and causes the K channel A word start signal on the line 120. This starts the clock in FIG. 13. The output of the latch 101, comprising the transmit K/L channel A signal, is applied to FIG. 13 to generate a K/L channel A word start signal for application in FIGS. 14 and 15. K channel A word start signal generated at the bottom of FIG. 9 is applied to FIG. 14 to cause advancement of a six stage ring 194 from a reset condition to a condition with stage one set, thereby causing a K/L channel A word one select signal to be generated for application to FIG. 15. The K channel A transmit clock is applied in FIG. 15 to advance the K/L channel A data shift register causing the data from the K/L sources (FIG. 12) to be gated through the OR circuit 168*a* and the time diversity, onto the channels. This process continues, as described hereinbefore, until all four data words and two words of zeros are clocked out at the transmitter onto the channels. In FIG. 13, when the all ones detector 184 turns off the K channel A transmit clock, at the same time that the appropriate ring in FIG. 14 is set to its highest ordered stage, thereby generating a K/L channel A last word signal, the channels 36 go quiet. Thereafter, the four bit monostable multivibrator 112 at the bottom of FIG. 9 times out and supplies the signal to an AND circuit 114. However, the inverter 126 is not supplying a signal to the AND circuit 114 because of the K/L channel A last word input to the OR circuit 128. Therefore, the AND circuit 114 does not operate. However some time later the sixteen bit monostable multivibrator 122 does time out and provides a K channel A period start signal on a line 124. This resets the command decode five bit binary counter 96 and the latches 101–107, and also is applied in FIG. 18 to the OR circuit 262 to cause the AND circuit 250 to generate the channel A command period start signal on the line 264, to cause operation as described hereinbefore. The K channel A period start signal is also applied in FIG. 18 to a 2 bit monostable multivibrator or delay circuit 290 so that just a few microseconds after the 4 bit shift register 276 is isolated from the command generator, the command generator 236 will be advanced from its current setting to the next subsequent command in the sequence of commands.

In the starting of command transmissions other than as a result of system reset, there are only two differences. One of them is that the command generator 236 is not forced to all ones, but instead is advanced to all ones as a result of the K channel A period start signals on the line 124. But the function of forcing the command generator 236 to the first address as a result of the channel A frame complete signal 242 does occur, the frame complete signal 242 resulting from the command generator having been advanced through all of the commands during operation of the system. A second difference is that, at the bottom of FIG. 9, the first K channel A word start signal (the one that starts the actual address word on its way) is generated by the OR circuit 118 in response to the channel A command word start signal (generated in the bottom of FIG. 18 on the line 270), rather than by the channel A reset word start signal on the line 260. However the subsequent two words of ZEROs or clock signals are enabled by the four bit monostable multivibrator 112 timing out, as described with respect to the system reset initiation of commands, hereinbefore.

Returning now to FIG. 17, the system reset can result from power first turning on as described hereinbefore, and can also result from a forced resetting of the system having become hung up for some reason. K channel A receiver clock signals generated in FIG. 7 on a line 64 are continuously applied to a four word monostable multivibrator 296, which will supply an output signal on a line 298 in the event that there are no signals on the channels 36 for a period of time equivalent to four data words (approximately 1.07 milliseconds). The signal on the line 298 will operate an AND circuit 300 provided that an inverter 302 is not operated as a result of a signal on the line 228. The inverter 302 prevents the AND circuit 300 from operating during the normal time out of the four word monostable multivibrator 226 immediately following the start up of the system. This prevents a signal on the line 298 from interfering with a full four word delay as a result of a power on which could occur as a result of spurious signals having deactivated the four word monostable multivibrator 296. The AND circuit 300 operates the OR circuit 230 in the same fashion as does the signal on the line 228. In other words, if the system does become quiescent for some reason (which could occur as a result of various transients altering counter or clock settings and driving the system out of synchronization, so that majority vote circuits could not return it to synchronization), then the system will be started up a fresh in the same fashion as when power is initially turned on. The frame stop switch 246 (FIG. 18) will stop system operation at the end of a complete frame of twelve commands, when open.

Receiver operation is somewhat simpler than the command and transmit operations as described hereinabove. For a receiver of one of the units to receive data, a command must be sent to indicate that that receiver should receive. As described hereinbefore, the command can be sent only after the line has been quiet for 16 bit times, which comprises an intercommand gap as illustrated in FIG. 5 and described hereinbefore. Therefore, prior to receiving any command signals, each receiver unit will have had a K channel A period start signal (or the equivalent) generated on the line 124 to reset the latches 101–107, the five bit binary counter 96, and in FIG. 10, to reset the four stage ring 140. Assume that a command for the J unit to transmit to the K unit is lodged in the circuitry of FIG. 9. This will result in the latch 102 being set generating a receive J/K channel A signal which operates the OR circuit 110 thereby to block the receipt of further signals in the 32 bit shift register 90, as described hereinbefore, and which is also applied to FIG. 10 to activate an appropriate one of the AND circuits 142. The 16 bit monostable multivibrator 122 having previously timed out (before the command was transmitted) the K channel A period start signal on line 124 has previously been available in FIG. 10 to reset the four stage ring 140. When the address has been completely sent, the channels 36 go quiet, and thereafter the four bit monostable multivibrator 112 at the bottom of FIG. 9 generate the K channel A word start signal on the line 120. This is applied to all of the AND circuits 142 in FIG. 10 so that the one of them receiving a command from FIG. 9 will advance its four stage ring 140 by one count. This causes the ring 140 to advance from a reset condition to a condition where the first stage is on, thereby to generate a signal to select word one in FIG. 11. With word one selected by an appropriate AND circuit 146, the data inserted into the lowest-ordered bit of the apropriate shift register 150 will be advanced by the receiver clock signals, as described hereinbefore. Notice that the receiver has no way of knowing when it is through receiving, there simply is no longer any data signals on the channels 36 as a result of the transmitter having counted a full word onto the channels. When the full word has been transmitted, the channels 36 go quiet and then the four bit monostable multivbrator 112 again times out (bottom of FIG. 9) to generate the K channel A word start signal 120 for a second time. This combined with a particular command will advance the four stage ring 140 in FIG. 10 to thereby select word two, and a second entire word is lodged in one of the shift registers 150–153 in FIG. 11. When all four words have been received, the line again goes quiet following which the 16 bit monostable multivbrator 122 in each receiver will reset all of the latches 101–107 at the same time that the command generator commences transmission of the next command in the sequence.

Although the invention has been shown and described with respect to a preferred embodiment thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. Data communication apparatus comprising:
a plurality of data transmission channel means, said plurality being in excess of two;
source means presenting a word-sized group of data signals for transmission on said channel;
transmitter means including a plurality of time diversity means responsive to said source means for presenting said data signals to each of said data transmission channels independently, said means presenting said group of data signals to each of said channels in a unit of time different from the unit of time when said means presents said group of data signals to each other one of said data transmission channels, each of said units of time being substantially contiguous;
receiver means including time diversity correction means responsive to data signals on all of said channels to present related groups of data signals received from all of said channels in a single unit of time, and including a majority vote means responsive to said time diversity correction means to provide a group of output data signals identical to the groups of data signals presented by said time diversity correction means from a majority of said channels; and
responder means responsive to said receiver means for receiving said group of output data signals.

2. Data communication apparatus according to claim 1 wherein:
said channel means comprise signal channels having signal lines wherein a signal of a first data significance is manifested by a first condition of said signal lines, and a signal of a second data significance is manifested by a second condition of said signal lines;
said transmitter means includes a plurality of driver means, one for each of said channel means, each responsive to the related one of said time diversity means for converting said words of data signals to signals of data significance on said signal lines; and
wherein said receiver means includes means responsive to said channel means for generating data signals of said first data significance in response to said first condition of said signal lines, and for generating clock signals in response to either one of said first and second conditions of said signal lines, and means responsive to said clock signals for synchronizing its response to said data signals.

3. Data communication apparatus according to claim 2 wherein:
said transmitter means includes a plurality of clock means, each related to one of said channel means, each for providing data synchronizing clocking signals for controlling the presenting of said data signals to the corresponding one of said channel means, each of said clock means being synchronized at the start of each related one of said units of time with at least one other one of said clock means.

4. Data communication apparatus according to claim 1 wherein:
said channel means comprise bipolar signal channels having a pair of signal lines wherein a signal of a first data significance is manifested by a first bipolar condition in which a first one of said lines is of a given polarity with respect to the second one of said lines, and a signal of a second data significance is manifested by a second bipolar condition in which the second one of said lines is of said given polarity with respect to the first of said lines;
said transmitter means includes a plurality of driver means, one for each of said channel means, each responsive to the related one of said time diversity means for converting said words of data signals to bipolar signals for application to said lines; and
wherein said receiver means includes means responsive to said channel means for generating data signals of said first data significance in response to said first bipolar condition of said lines, and for generating clock signals in response to either of said bipolar conditions, and means responsive to said clock signals for synchronizing its response to said data signals.

5. Data communication apparatus according to claim 4 wherein:
said transmitter means includes a plurality of clock means, each related to one of said channel means, each for providing data synchronizing clocking signals for controlling the presenting of said data signals to the corresponding one of said channel means, each of said clock means being synchronized at the start of each related one of said units of time with at least one other one of said clock means.

6. A data communication system comprising:
a data communication link including a plurality of independent data communication channels, said plurality being in excess of two; and
a plurality of units, each of said units including a transmitter portion and a receiver portion, one of said units including a command generating portion, said data communication link interconnecting all of said units including connecting each of said transmitters with each of said receivers, each of said units including means associated with each of said receivers for sensing the lack of signals on said communication link for a given period of time to generate a communication start signal, means in each of said receivers for registering a transmission command indicative for the related unit to transmit, and means responsive to said transmit command and to said start signal to cause the related transmitter to transmit, each of said transmitter portions including a plurality of clock signal generating means, one for each of said data channels, each of said receiver portions including a plurality of said communication start signal generating means, each of said clock signa generating means including one of said start means, each of said clock signal generating means being dependent on receipt of communication start signals from a majority of said communication start signal generating means of the related unit in order to initiate generation of clock signals, whereby said clock signals are synchronized by said communication start signals.

* * * * *